United States Patent
Dafni et al.

(10) Patent No.: US 8,573,395 B1
(45) Date of Patent: Nov. 5, 2013

(54) ELECTRONIC DEVICE PROTECTION ASSEMBLY

(76) Inventors: Nicholas M. Dafni, Centennial, CO (US); Tabitha J. Dafni, Centennial, CO (US)

( * ) Notice: Subject to any disclaimer, the term of this patent is extended or adjusted under 35 U.S.C. 154(b) by 83 days.

(21) Appl. No.: 13/327,759

(22) Filed: Dec. 16, 2011

(51) Int. Cl.
*B65D 85/00* (2006.01)

(52) U.S. Cl.
USPC ............................................ 206/320; 206/235

(58) Field of Classification Search
USPC ................. 206/320, 235, 216, 581, 38, 37; 455/575.1, 575.8; 361/679.55, 679.56
See application file for complete search history.

(56) References Cited

U.S. PATENT DOCUMENTS

| | | | |
|---|---|---|---|
| 5,330,056 A * | 7/1994 | de la Rocha | 206/581 |
| 5,586,653 A * | 12/1996 | Taveroff | 206/362 |
| 6,311,077 B1 | 10/2001 | Bien | |
| 6,424,823 B1 | 7/2002 | Moles | |
| 6,768,634 B2 * | 7/2004 | Kim | 361/679.09 |
| 6,788,919 B2 | 9/2004 | Watanabe | |
| 7,146,184 B1 | 12/2006 | Tsitsiashvili | |
| 7,194,289 B1 | 3/2007 | Flores, Jr. | |
| 7,431,161 B2 * | 10/2008 | Carlino | 206/581 |
| 7,440,269 B2 * | 10/2008 | Liao et al. | 361/679.55 |
| D624,518 S | 9/2010 | Li | |
| 8,251,210 B2 * | 8/2012 | Schmidt et al. | 206/320 |
| 2003/0147208 A1 * | 8/2003 | Kim | 361/683 |
| 2005/0155618 A1 * | 7/2005 | Lafferty | 132/104 |
| 2005/0277453 A1 * | 12/2005 | Kim | 455/575.8 |
| 2006/0056838 A1 * | 3/2006 | Chen | 396/448 |
| 2007/0066247 A1 * | 3/2007 | Mooney | 455/90.3 |
| 2010/0224519 A1 * | 9/2010 | Kao | 206/320 |
| 2011/0089077 A1 * | 4/2011 | Ziemba | 206/570 |
| 2012/0112490 A1 * | 5/2012 | Fukatsu | 296/97.1 |
| 2012/0228181 A1 * | 9/2012 | Damon et al. | 206/521 |
| 2012/0244918 A1 * | 9/2012 | Hall | 455/575.4 |
| 2013/0098788 A1 * | 4/2013 | McCarville et al. | 206/320 |

* cited by examiner

*Primary Examiner* — Steven A. Reynolds

(57) ABSTRACT

An electronic device protection assembly includes a case including a back wall and a perimeter wall that is attached to and extends forward of the back wall. The perimeter wall includes a front edge that is distal to the back wall. An inwardly extending flange is attached to and coextensive with the front edge. The flange has an inner edge defining a phone aperture configured to allow access to a front side of an electronic device. A mirror is attached to the back wall. The case has the electronic device positioned between the back wall and the flange to enclose and protect the electronic device.

6 Claims, 4 Drawing Sheets

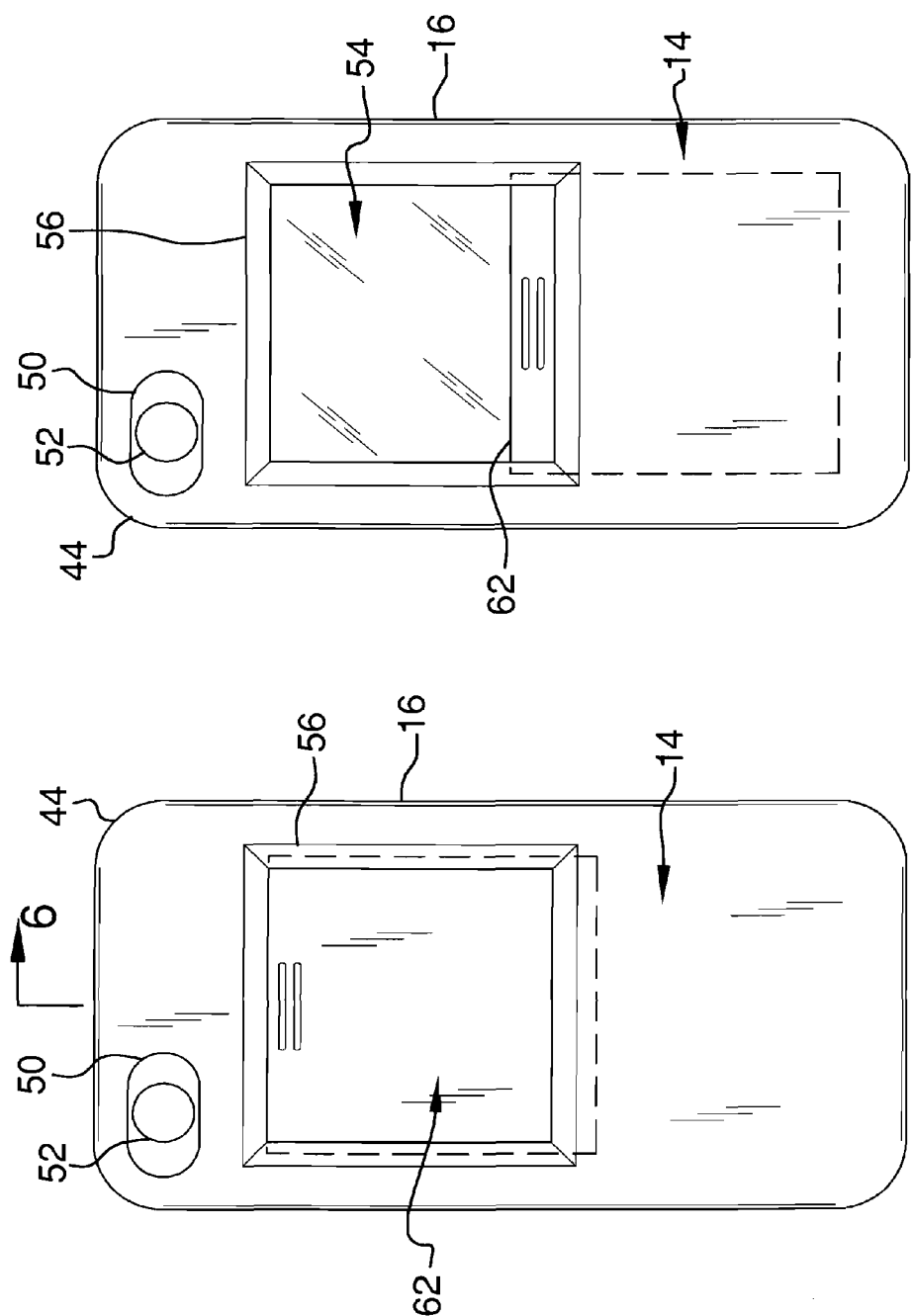

ELECTRONIC DEVICE PROTECTION ASSEMBLY

BACKGROUND OF THE DISCLOSURE

Field of the Disclosure

The disclosure relates to electronic device protection devices and more particularly pertains to a new electronic device protection device for enclosing and protecting an electronic device.

SUMMARY OF THE DISCLOSURE

An embodiment of the disclosure meets the needs presented above by generally comprising a case including a back wall and a perimeter wall that is attached to and extends forward of the back wall. The perimeter wall includes a front edge that is distal to the back wall. An inwardly extending flange is attached to and coextensive with the front edge. The flange has an inner edge defining a phone aperture configured to allow access to a front side of an electronic device. A mirror is attached to the back wall. The case is configured to have the electronic device positioned between the back wall and the flange to enclose and protect the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a first back side view of an embodiment of the disclosure.

FIG. 5 is a second back side view of an embodiment of the disclosure.

DESCRIPTION OF THE PREFERRED EMBODIMENT

Figure 1:
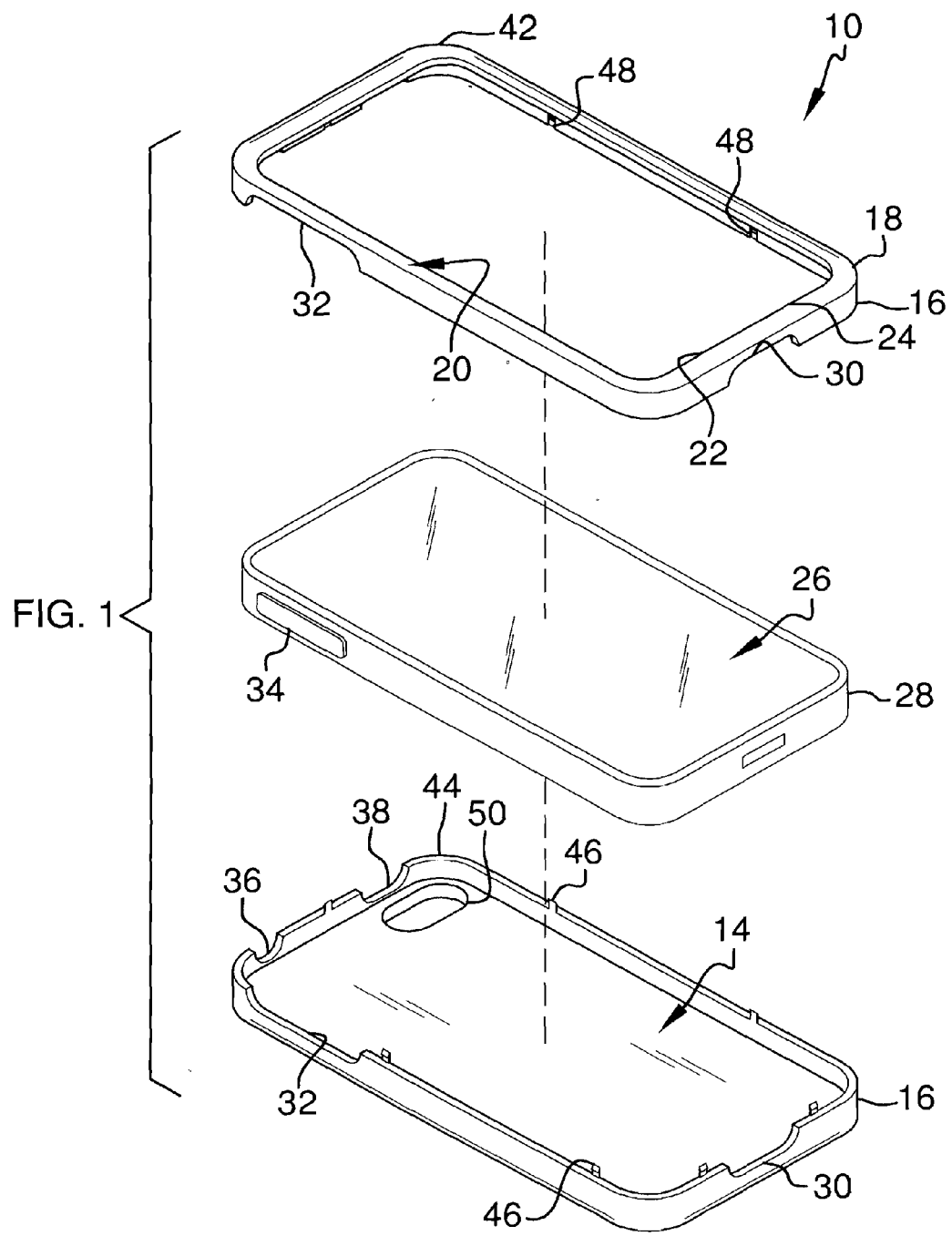
FIG. 1 is a top perspective exploded view of an electronic device protection assembly according to an embodiment of the disclosure.
Figure 2:
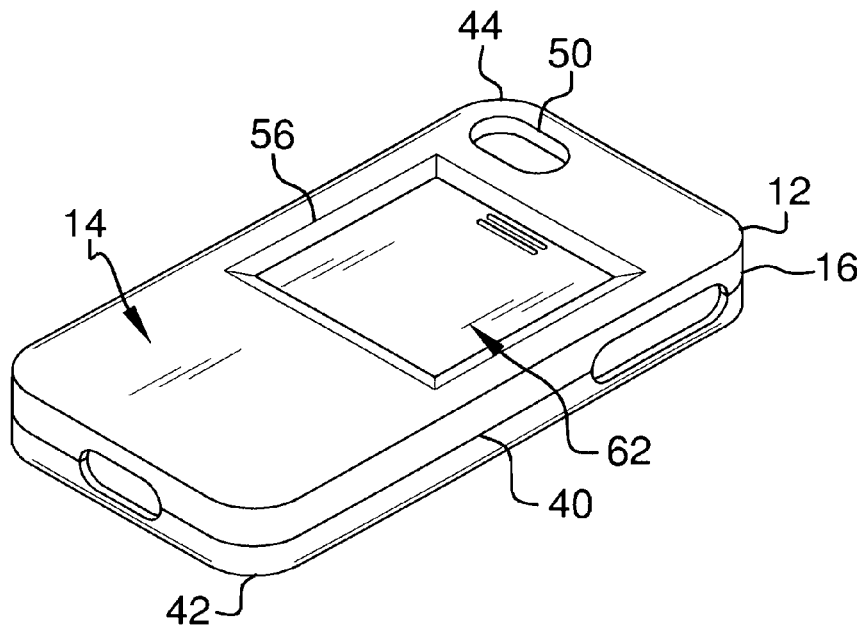
FIG. 2 is a left side perspective view of an embodiment of the disclosure.
Figure 3:
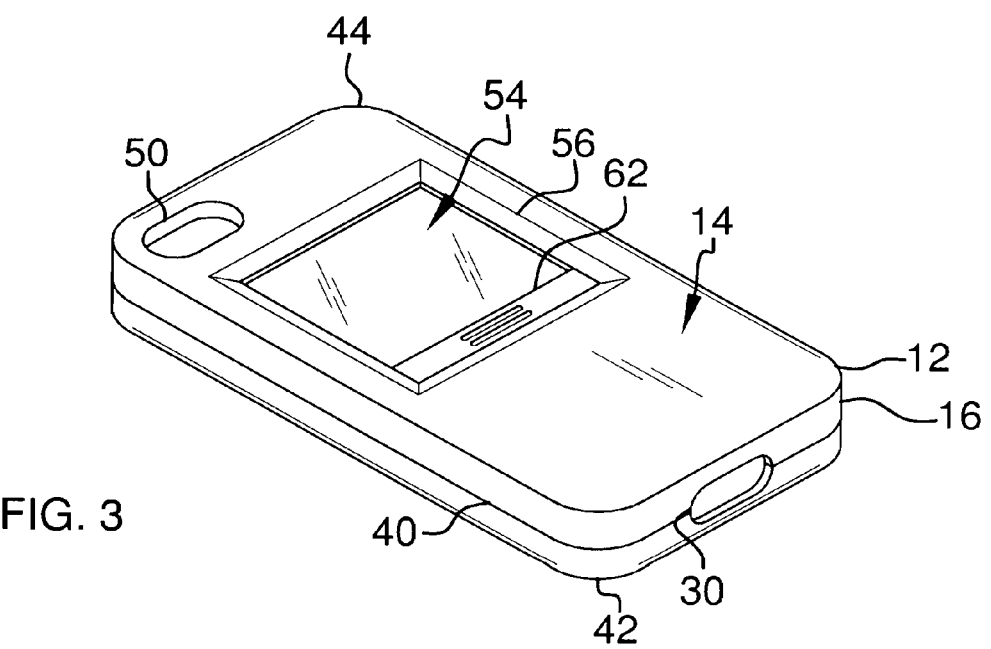
FIG. 3 is a right side perspective view of an embodiment of the disclosure.
Figure 6:
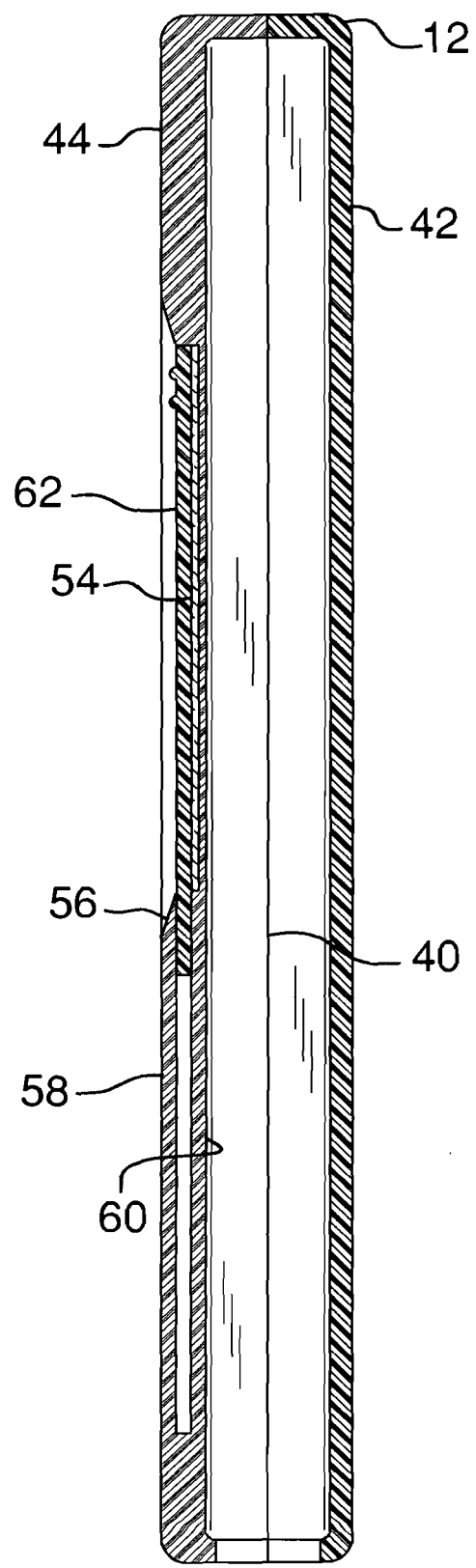
FIG. 6 is a cross sectional view taken along line 6-6 of FIG. 4 of an embodiment of the disclosure.

With reference now to the drawings, and in particular to FIGS. 1 through 6 thereof, a new electronic device protection device embodying the principles and concepts of an embodiment of the disclosure and generally designated by the reference numeral 10 will be described.

As best illustrated in FIGS. 1 through 6, the electronic device protection assembly 10 generally comprises a case 12 including a back wall 14 and a perimeter wall 16 that is attached to and extends forward of the back wall 14. The perimeter wall 16 includes a front edge 18 that is distal to the back wall 14 and an inwardly extending flange 20 that is attached to and coextensive with the front edge 18. The flange 20 has an inner edge 22 that defines a phone aperture 24 configured to allow access to a front side 26 of an electronic device 28. The electronic device 28 may comprise, in particular, a cellar phone, tablet computer, or the like.

The perimeter wall 16 has a first aperture 30 extending therethrough and is configured to receive a data cable. The perimeter wall 16 may have a second aperture 32 extending therethrough configured to access actuators 34 on the electronic device 28. The perimeter wall 16 may have a third aperture 36 extending therethrough that is configured to receive a headphone cable. The perimeter wall 16 may further have a fourth aperture 38 extending therethrough configured to access an antenna of the electronic device 28. Additional apertures may be provided as needed depending on the configuration of the electronic device 28.

The perimeter wall 16 has a break 40 therein to define a front portion 42 of the case including the flange 20 and a rear portion 44 of the case including the back wall 14. A plurality of locking members 46 is attached to the rear portion 44 and releasably secures the front portion 42 to the rear portion 44. The locking members 46 are configured to frictionally engage channels 48 that are positioned on the front portion 42. The back wall 14 has a camera aperture 50 extending therethrough and is configured to be aligned with a camera lens 52 of the electronic device 28. The case 12 may be comprised of a rigid material such as plastic or other similar material, though elastomeric or plastic materials having resiliently bendable properties may also be used. The case 12 is configured to have the electronic device 28 positioned between the front 42 and rear 44 portions to enclose and protect the electronic device 28.

A mirror 54 is attached to the back wall 14 and the back wall 14 may have a well 56 therein such that the mirror 54 is positioned within the well 56 and furthermore may be positioned between an outer surface 58 and an inner surface 60 of the back wall 14. The mirror 54 may be of any conventional design. A cover 62 may be slidably coupled to the back wall 14 and the cover 62 is slidably positionable in a closed position to cover the mirror 54 or in an open position to expose the mirror 54. The cover 62 is positioned between the outer surface 58 and the inner surface 60 of the back wall 14 when the cover 62 is slid to the open position.

In use, the electronic device 28 may be placed between the front 42 and rear 44 portions. The locking members 46 frictionally engage the channels 48 to secure the front 42 and rear 44 portions to each other to enclose the electronic device 28. The cover 62 may be slid to the open position to expose the mirror 54 for personal grooming and the like. The cover 62 may be slid to the closed position to cover and protect the mirror 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An electronic device protection assembly comprising:
 a case including a back wall and a perimeter wall being attached to and extending forward of said back wall, said perimeter wall including a front edge being distal to said back wall, an inwardly extending flange being attached to and coextensive with said front edge, said flange having an inner edge defining a phone aperture configured to allow access to a front side of an electronic device;
 a mirror being attached to said back wall;
 wherein said case is configured to have the electronic device positioned between said back wall and said flange to enclose and protect the electronic device;
 wherein said back wall has a well therein, said minor being positioned within said well and being positioned between an outer surface and an inner surface of said back wall; and
 a cover being slidably coupled to said back wall, said cover being slidably positionable in a closed position to cover said mirror or in an open position to expose said mirror.

2. The assembly according to claim 1, wherein said perimeter wall having a first aperture extending therethrough and being configured to receive a data cable, said perimeter wall having a second aperture extending therethrough and being configured to access actuators on the electronic device.

3. The assembly according to claim 1, wherein said perimeter wall has a break therein to define a front portion of said case including said flange and a rear portion of said case including said back wall, a plurality of locking members being attached to said case and releasably securing said front portion to said rear portion.

4. The assembly according to claim 1, wherein said back wall having a camera aperture extending therethrough and being configured to be aligned with a camera lens of the electronic device.

5. The assembly according to claim 1, wherein said case is comprised of a rigid material.

6. An electronic device protection assembly comprising:
 a case including a back wall and a perimeter wall being attached to and extending forward of said back wall, said perimeter wall including a front edge being distal to said back wall, an inwardly extending flange being attached to and coextensive with said front edge, said flange having an inner edge defining a phone aperture configured to allow access to a front side of an electronic device, said perimeter wall having a first aperture extending therethrough and being configured to receive a data cable, said perimeter wall having a second aperture extending therethrough and being configured to access actuators on the electronic device;
 said perimeter wall having a break therein to define a front portion of said case including said flange and a rear portion of said case including said back wall;
 a plurality of locking members being attached to said case and releasably securing said front portion to said rear portion;
 said back wall having a camera aperture extending therethrough and being configured to be aligned with a camera lens of the electronic device;
 said case being comprised of a rigid material;
 a mirror being attached to said back wall, said back wall having a well therein, said minor being positioned within said well and being positioned between an outer surface and an inner surface of said back wall;
 a cover being slidably coupled to said back wall, said cover being slidably positionable in a closed position to cover said minor or in an open position to expose said mirror; and
 wherein said case is configured to have the electronic device positioned between said front and rear portions to enclose and protect the electronic device.

* * * * *